United States Patent [19]

Petersen

[11] Patent Number: 4,981,105

[45] Date of Patent: Jan. 1, 1991

[54] METHOD FOR INCREASING PERFORMANCE OF RUMINANT ANIMALS

[75] Inventor: Mark K. Petersen, Bozeman, Mont.

[73] Assignee: Research and Development Institute, Inc. at Montana State University, Bozeman, Mont.

[21] Appl. No.: 421,599

[22] Filed: Oct. 16, 1989

[51] Int. Cl.$^5$ ............................................. A23K 1/18
[52] U.S. Cl. .................................... 119/74; 424/438; 424/442; 426/807
[58] Field of Search .................... 119/1; 424/438, 442; 426/2, 807

[56] References Cited

U.S. PATENT DOCUMENTS

| | | | |
|---|---|---|---|
| 3,857,971 | 12/1974 | Abdo et al. | 426/53 |
| 3,873,728 | 3/1975 | Moore | 426/2 |
| 3,968,253 | 7/1976 | Bertram et al. | 426/2 |
| 4,056,658 | 11/1977 | Bertram et al. | 426/2 |
| 4,109,019 | 8/1978 | Moore | 426/807 |
| 4,175,121 | 11/1979 | Mantha | 424/94 |
| 4,595,584 | 6/1986 | Wu et al. | 424/438 |
| 4,675,174 | 6/1987 | Eckenhoff | 424/15 |
| 4,701,328 | 10/1987 | Bercovici et al. | 426/2 |
| 4,705,689 | 11/1987 | Tanner et al. | 426/2 |
| 4,713,245 | 12/1987 | Ando et al. | 424/438 |

OTHER PUBLICATIONS

Clark et al, Journal of Animal Science, 1988, vol. 66, pp. 643-749.
Lodman et al, Proceedings, Western Section, American Society of Animal Science, vol. 39, 1988.
Wiley et al, Proceedings, Western Section, American Society of Animal Science, vol. 39, pp. 237-240, Jul. 1988.
Wiley et al, Proceedings, Western Section, American Society of Animal Science, vol. 40, 1989.
Sorensen et al, Proceedings, Western Section, American Society of Animal Science, vol. 40, 1989.

Primary Examiner—John Weiss
Attorney, Agent, or Firm—Lowe, Price, LeBlanc, Becker & Shur

[57] ABSTRACT

DL-methionine is fed to a ruminant animal in slow release form so as to stimulate protein growth in the first stomach or rumen and thus control growth of the animal.

6 Claims, No Drawings

METHOD FOR INCREASING PERFORMANCE OF RUMINANT ANIMALS

TECHNICAL FIELD

This invention relates to a method for supplementing the ruminal function in livestock and more particularly, relates to methods for stimulating microbial protein synthesis in livestock by controlled DL-methionine addition to the rumen and thus increasing or decreasing growth of livestock.

DISCLOSURE OF THE INVENTION

Animals such as livestock, e.g., sheep, goats, beef or dairy cattle, utilize two sources of protein which are absorbed by the small intestine. The primary source is microbial protein produced in the first stomach (rumen) of livestock which is washed out to the small intestine where it is absorbed. The second source is feed protein which escapes microbial manipulation and reaches the small intestine nearly in the same form in which it was fed. These escape feed proteins are incorporated in diets when the predicted quantity of ruminally produced microbial protein cannot satisfy the animals protein requirement. Most high protein feeds (20% crude protein or more) are used to supply nitrogen to the microflora in the rumen. These microbes then grow and are believed to improve animal performance by either stimulating appetite, diet digestibility or microbial protein reaching the small intestine.

There have been numerous studies conducted to delineate the effects of protein supplementation on the grazing ruminant. Various measurements and approaches have been utilized to determine these effects. Clark and Petersen, *J. Anim. Sci. Vol. bb*, p. 743, (1988), as well as other reports have used NDF disappearance rates as a major indicator of supplementation effects. McCollum and Galyean, *J. Anim. Sci. Vol.* 60, p. 470 (1985), indicated that ruminal dilution rates may be an important effect caused by protein supplementation. Stern and Hoover, *J. Anim. Sci., Vol.* 49, p. 1590, (1979), stated that for a maximal ruminal efficiency to occur, availability of nitrogen and energy in the rumen must be balanced. Therefore, ruminal ammonia supplied by a protein supplement could be an important factor in maintaining an optimal nitrogen-energy balance thus affecting ruminal function. Silva et al, *Brit. J. Nutr.*, Vol 57, p. 407, (1986) suggested that particle-bound microbial enzyme activity was a better predictor of ruminal fiber degradation than microbial density on the fed particles. Wood et al, *FEMS Microbiology Letters*, Vol. 34, p. 37, (1986) isolated a highly active extracellular cellulase enzyme secreted by fungi in the rumen which may be of major importance in cellulose degradation as influenced by supplementation. All of these ruminal parameters are of importance in understanding ruminal function; however, a comparison of their relative importance has not been made.

Brown et al, *J. Anim. Sci.*, Vol. 36, p. 1010, (1973) used principal component analysis to estimate the relationships among measures of animal size and shape in immature beef bulls. This procedure provides a method to explain convariance structure among a large system of measurements by producing a smaller number of artificial variates. Principal component analysis could also be used to contrast ruminal parameters, and allow for objective evaluation of their relationships and relative importance for predicting the effect of supplementation.

SUMMARY OF THE INVENTION

It is accordingly one object of the invention to provide a method for the use of DL-methionine to stimulate microbial protein synthesis in the rumen of livestock.

A further object of the invention is to provide a method for controlling the growth of livestock by the controlled addition of DL-methionine to the first stomach or rumen of livestock to directly control production of protein therein.

The present invention provides a method for stimulating microbial protein synthesis in the first stomach or rumen of livestock which comprises the addition of DL-methionine to the rumen.

In a more preferred embodiment the DL-methionine is fed to the animal in its food and wherein the DL-methionine is contained in slow release form to be released in the first stomach or rumen over a period of time. Obviously, materials equivalent to DL-methionine to control the same or other functions may also be utilized using the concepts of the invention.

DESCRIPTION OF PREFERRED EMBODIMENTS

This invention provides a method for use of DL-methionine to stimulate microbial protein synthesis and thus provides a procedure for supplementing the ruminal function in livestock and control growth of the livestock. The invention may be used as a substitute for protein feeds traditionally used in ruminant livestock diets.

It has been found that when the rumen is supplied with less than 10 grams of DL-methionine per day (an amino acid), this causes a stimulation of ruminal microbial protein synthesis. The quantity of ruminal microbial protein produced exceeds the protein derived from the use of traditional feeds such as soybean meal. The action of DL-methionine is targeted to the microflora residing in the liquid fraction of the ruminal contents. Therefore, DL-methionine increases microbial protein synthesis derived from the liquid fraction of the rumen. Due to the fact that the liquid born bacteria are targeted, the use of escape protein used in many diets is unnecessary. The treatment of the present invention causes such a rise in microbial protein production that the prediction equation used by the National Research Council (for nutritional requirements) cannot predict this response. This use of DL-methionine in ruminant diets to stimulate microbial protein synthesis is unique.

At the present time DL-methionine is not used for this purpose and should be distinguished from DL-methionine which has been protected to escape use by the ruminal microflora and passing to the small intestine.

Since DL-methionine is such a potent stimulator of protein synthesis of liquid born bacteria, and these organism are extremely competitive and rapid in their uptake of substrate, DL-methionine must be slowly released to the ruminal environment. The life of DL-methionine in the rumen is less than 45 minutes. When DL-methionine is to be used to promote microbial protein synthesis of livestock grazing extensive range or pasture environments, it is important that methionine or any amino acid be constantly released into the rumen for utilization by the microflora.

In summary the uniqueness of this product is that it:
1. Targets the microbial pool in the liquid fraction of the rumen.
2. It stimulates ruminal microbial protein synthesis beyond any current expectations.
3. A sustained release of amino acids is necessary for the promotant effect to be demonstrated at maximum.

The action or process by which DL-methionine enhances animal performance via stimulation of microbial protein synthesis in the liquid fraction of the ruminal digesta has not been disclosed previously. Secondly, the use of DL-methionine as a ruminal microbial stimulant is not practiced or known by the feeding industry. Thirdly, it is demonstrated that the application of a continual release mechanism is essential for the manifestation of the stimulatory action. The successful use of slow release has not been disclosed previously.

In the present invention, it is demonstrated that DL-methionine or equivalent material will stimulate the production of protein in the first stomach or rumen of a ruminant animal (e.g. cow). It has also been established that this can be accomplished by feeding the DL-methionine to the animal so that the DL-methionine is slowly released in the stomach. This mechanism thus provides more or less continuous stimulation of protein in the stomach and thus provides a method for enhancing the performance of the animal. Thus, growth of the animal can be controlled using the method of the invention. Growth enhancement is particularly beneficial.

The DL-methionine may be fed to the animal in any desired slow release form. Thus, it may be incorporated into capsules, pills, boluses, lozenges, or the like and incorporated into the animal's food. Slow release devices of this type are well known in the art. The slow release devices may be incorporated into any type of food including salt licks, for feeding the animal.

In preferred embodiments, the DL-methionine is incorporated into an edible capsule in coated or uncoated form. The capsules are then incorporated into the animal's food and fed to the animal. Since the DL-methionine is used immediately to stimulate production of protein, repeated feedings (e.g. every six hours), is preferable.

In establishing the concepts of this invention principal component analyses were employed to ascertain the mechanisms by which supplementation effects ruminal function and to utilize this analysis to interpret responses due to supplementation. A metabolism trial was conducted using twelve prepartum beef cows grazed on native foothill range from mid-December to early March. Three treatment groups were supplemented (kg/d) with either non (CON); 5, methionine in beet pulp carrier (BPM); or 4, soybean meal (SBM). Cows were individually fed supplements on alternating days. Ruminal measurements used in the analysis were liquid and particle bound carboxymethylcellulase (CMCase) activity, whole ruminal, liquid, and particle bound purine concentrations, in situ NDF disappearance, pH, fluid and particle dilution rates and ruminal ammonia concentrations. The major components of the first factor affected by supplementation were NDF disappearance, particle dilution rate and CMCase activity in liquid fraction. Second factor consisted of particle bound purine concentration and bound CMCase activity. The third factor had whole rumen and liquid purina concentration and ruminal ammonia as major components. Therefore, supplementation has the greatest effect on NDF disappearance and particle dilution rates, which are strongly influenced by increased enzymatic activity, initially from the liquid fraction and later from the particle bound microbes. Supplementation also changes overall microbial density in the rumen; however, this increase seems to have little affect on cellulose digestion. The major increase in cellulose digestion comes from increasing activity of cellulolytic microorganisms.

An in situ digestion trial was initiated the last 4 days of the study to measure ruminal NDF disappearance rate. Nylon bags were incubated, ruminal dilution rate, whole ruminal purine concentration, ruminal ammonia concentration and pH were determined. Results are shown in Table 1. Liquid ruminal samples ($\frac{1}{4}$ 350 ml) and whole rumen digesta samples ($\frac{1}{4}$ 350 ml) were obtained near the reticulo-omasal orifice and mixed with 1 ml of 5% $HgCl_2$ to cease microbial activity. Samples were obtained at 0, 3, 6, 9, 20, 24, 30 and 48 h post supplementation to represent the 48 hr supplementation cycle. Liquid ruminal samples and whole ruminal digesta samples were frozen at $-20\frac{1}{2}$ C. for later analysis.

Whole ruminal digesta samples were dried at $100°\frac{1}{4}$ C. for 48 h, ground through a 1 mm screen and analyzed for purine concentration using the method of Zinn and Owens, Can J. Anim. Sci., Vol. 66, p. 157 (1986). Liquid ruminal samples were strained through eight layers of cheese cloth and $\frac{1}{4}$ 75 ml were dried 100° C. for 48 hours to obtain approximately 1 g of DM for purine analysis, Zinn and Owens, supra. The nylon bags were thawed and rinsed in cold water to remove non-adherent microbes and ruminal debris. Remaining contents were divided, with half being dried at $100\frac{1}{2}$ C. for 48 hours and analyzed for purine concentration (Zinn and Owens, supra), and the remainder utilized for carboxymethycellulase (CMCase) analysis.

Carboxymethylcellulase extraction was conducted on the contents of the nylon bags as described by Silva et al Brit. J. Nutr., Vol. 57, p. 407) (1987) using a carbon tetrachloride procedure. Ten ml of each ruminal liquid sample was also analyzed; however, due to discoloration of the solution by the ruminal fluid, an individual blank was run for each sample. Hydrolysis of sodium carboxymethylcellulose was assayed by measuring the formation of reducing sugar using 3,5-dinitrosalicylic acid (DNS) reagent. D-Glucose (NBS) was used as the standard. CMCase activity was expressed as $\mu$mol glucose released/g per hour of forage sample or $\mu$mol glucose released/ml per hour of liquid sample.

Statistical Analysis. All estimates were subjected to analysis of variance using General Linear Models Procedures (SAS, 1987) to separate differences between treatments. All models used treatment, hour, and treatment hour interactions and the models used single degree of freedom orthogonal contrasts with cow (treatment) mean square as the error term. Orthoginal contrasts utilized were CON vs Supplement (SUP), and BPM vs SBM. Principal component analysis used the Factor Procedure (SAS, 1987, SAS Institute, Inc.).

Principal Components of Rumen Function. Ten ruminal measurements were subjected to principal component analysis and results are presented in Table 1. The analysis grouped the ruminal measurements into four factors.

The first factor, which represents 46.4% of the variation caused by supplementation on ruminal function, is composed of three major components. These components are NDF disappearance rate, particle dilution rate and CMCase activity in the ruminal liquid fraction, all of which had values greater than 0.88. The fourth component of a lesser prediction value was fluid dilution rate with a value of 0.77. The NDF disappearance rate and particle passage rate would be expected to be highly affected by supplementation considering the fiber content of diets that the grazing animal consumes This would agree with Clark and Petersen, *J. Anim. Sci.*, Vol. 63, p. 243 (1988), who Galyean, *J. Anim. Sci.*, Vol. 60, p. 470, (1985); Caton et al *J. Anim. Sci.*, Vol. 66, p. 2262, (1988), who found increased dilution rates with supplementation of animals fed low quality forage. The importance of CMCase activity in the liquid fraction would indicate that the microbial population in the rumen can produce extracellular enzymes in response to supplementation or a feeding bout, and probably contributes to the initial digestion of cellulose. Extracellular cellulase could be produced by sources other than bacteria. Wood et al, *FEMS Microbiology Letters*, Vol. 34, p. 37 (1986), isolated ruminal fungi which secretes a very active extracellular cellulase.

The second factor, which accounts for 23.5% of the variation, has two major components: purine concentration and CMCase activity isolated from incubated forage in situ. These components are of approximately equal importance with values of 0.75. These two account for only half as much variation as explained by factor 1. This relationship, between the factors, may be due to the time lag that occurs for cellulolytic bacteria to adhere and initiate degradation of fibrous particles, Akins and Barton *Federation Proceedings*, Vol. 42, p. 114 (1983).

The third factor, which accounts for under 17% of the variation, is composed of three components. These are ruminal liquid and whole ruminal purine concentrations and ruminal ammonia concentration, with values of 0.50, 0.71 and 0.60 respectively. The whole ruminal purine concentration are probably closely related to changes seen in liquid purine concentration since purine concentration on the incubated forage remained constant after an initial increase through 9 h. Ruminal ammonia, a component in this factor was measured between 0.7 and 4.0 mg/dl throughout the study. These levels may have caused ammonia to become a significant component because the highest value reported was below the 5 mg/dl reported by Satter and Slyter, *Brit. J. Nutr.*, Vol. 32, p. 199 (1974) needed for maximal microbial yield, indicating ammonia might have been a limiting factor.

The fourth and final factor, which represents 13.3% of the variation, has only one important component pH. Due to the narrow range of pH in this study it is probably of minor biological importance.

This analysis demonstrates the possible mechanisms of how supplementation effects ruminal function. Supplementation has the greatest effect on NDF disappearance and ruminal dilution rates. These parameters are most strongly influenced by enzymatic activity first from the liquid fraction (component of factor 1) and later by the cellulolytic microbes attached to the forage (factor 2). Finally supplementation also changed the overall microbial density in the rumen, as shown by the increase in liquid purine concentration (factor 3) but also increased CMCase activity (in ruminal liquid-factor 1 and on incubated forage-factor 2).

Supplementation effects. Among the important components in the first factor, NDF disappearance rate and particle dilution rate reported by Lodman et al (1989) showed a difference ($P<0.05$ and $P<0.1$, respectively) between CON (1.34 %/h; 2.66 %/h) and SUP (1.66 %/h; 3.09 5/h), respectively for NDF disappearance and particle dilution rate. Supplement source did have an effect ($P<0.05$) on NDF disappearance (2.02 %/h vs 2.38 %/h for BPM and SBM, respectively) but did not affect ($P<0.05$) particle dilution rate. CMCase activity in the liquid fraction showed no treatment differences; however, activity in SUP groups was higher ($P<0.01$) at 20 h than the CON where activity dropped after 9 h. This period of increased activity in the SUP group corresponds to a period in which the slope of the NDF disappearance curve is the greatest. This could indicate that the increase in NDF disappearance due to supplementation might possibly be influenced by a short term stimulation of extracellular cellulase secretion by a portion of the ruminal microbial population. It is also interesting to note that CMCase activity is twice as high in the liquid fraction as compared to particle bound activity, which indicates that extracellular enzymes may be of major importance in fiber degradation.

No difference due to treatment was shown by the important components of the second factor. The increase in purine concentration would indicate that there are only a limited number of attachment sites on the forage particles and any increase in forage degradation from this microbial population would come in the form of increased activity. CMCase activity of adhered microbes was not significantly different between treatments. However, there is a trend for the SUP groups to have higher activity at specific times. SBM tends to have higher activity ($P=0.06$) at 20 h and BPM had higher activity ($P<0.05$) at 24 h. This would indicate that we stimulated activity without increasing the microbial population. Correlations between CMCase activity on incubated forage and NDF disappearance had a r value of $-0.098$ and the correlation between purine concentration on incubated forage and NDF disappearance was $-0.55$. These data agree closely with Silva et al *Brit. J. Nutr.*, Vol. 57, p. 407 (1987). Silva et al, showed a similar amount of activity on the ammonia treated straw and either beet pulp, barley or barley and fishmeal. Using NAD-linked glutamate dehydrogenase as a microbial marker, Silva et al also saw a low relationship between microbial numbers attached to the straw and their ability to digest it.

The important components in the third factor showed interesting differences. Whole rumen purine concentrations showed a treatment * time interaction, which was caused by a sharp increase in purine concentration 6 h post-supplementation. SBM had a higher peak; however, this peak did not translate into increased CMCase activity. SBM also had higher liquid purine concentration ($P<0.05$) than BPM. Once again there was no corresponding increase in CMCase activity in the liquid fraction. These data would indicate that SBM must be stimulating a portion of the microbial population associated with the ruminal liquor that do not produce CMCase. Ruminal $NH_3$ levels were the other important component of the third factor. Ammonia levels at all sampling times were below the 5 mg/dl. Ammonia levels at all sampling times were below the 5 mg/dl indicated by Satter and Slyter, supra for maximal microbial synthesis. SBM supplemented cows did receive approximately 3.5 times the quantity (44 g/h/d vs 146 g/h/d, BPM and SBM, respectively) of protein as BPM and they still had similar $HG_3$ concentrations. This would indicate that the non-CMCase producing microbes were utilizing the available ruminal nitrogen derived from SBM to increase their concentration as suggested by liquid and whole ruminal purine concentrations.

It is apparent that BPM was not a complete substitute for SBM for gestating cows grazing winter range. SBM cows gained weight during the study while BPM cows maintained their weight. However, ruminal kinetics indicate that BPM had similar effects on the ruminal parameters as SBM, except for total liquid and whole ruminal purine concentrations. It would seem that the SBM, due to a greater supply of riminal ammonia, was utilized by non-cellulolytic microorganisms to multiply. This increased in concentration may have resulted in an increase in microbial protein delivered to the small intestine. This study strongly suggests that the effect of protein supplementation that influences cow weight change is the quantity of microbial protein delivered to the small intestine as enhanced by the supplement. BPM did not supply additional nitrogen for ruminal ammonia production which may have limited microbial protein delivered to the small intestine. Therefore, the differences noted in the production data could be due to an increase in microbial protein production from the liquid portion of the rumen and subsequently reaching the small intestine of cows on the SBM treatment.

EXAMPLE 1

A winter trial was conducted at the Red Bluff Research Station, Norris, Mont. The trial lasted from December 26 until March 3. Twelve ruminally cannulated cows were selected from the cannulated cows present on the ranch.

Treatments. Four rumen cannulated cows were randomly allocated to one of three treatment groups. However, during the trial one cannulated cow was determined to be ill and removed from the study. Treatments were: control (CON) which received no supplement, D-L methionine in beet pulp carrier (BPM), and soybean meal (SBM). Supplements were formulated to be isocaloric but not isonitrogenous (BPM=8.8% protein, SBM=36.5% protein). BPM was formulated to supply 9g/h/d of DL-methionine. SBM supplied 1.5g/h/d of L-methionine. These supplements were designed to provide an extreme in protein nutrition in order to minimize experimental confounding of N intake with DL-methionine intake.

EXAMPLE 2

DL-methionine capsules were prepared by coating the DL-methionine with a fatty acid and placing in edible gelatin capsules. About 6 grams of DL-methionine was contained in each capsule. One capsule was placed in cows' food and fed to the cows every six hours since it was calculated that the capsules would release DL-methionine in the first stomach for about 7 hours.

TABLE 1
COEFFICIENTS OF PRINCIPAL COMPONENTS OBTAINED FROM RUMINAL MEASUREMENTS OF GESTATING COWS GRAZING WINTER RANGE

| Ruminal Measurement | FACTORS | | | |
|---|---|---|---|---|
| | 1 | 2 | 3 | 4 |
| Purine Concentrations | | | | |
| Incubated forage | −0.52 | 0.75 | 0.17 | −0.04 |
| Liquid fraction | −0.33 | −0.35 | 0.51 | −0.38 |
| Whole rumen | 0.18 | 0.46 | 0.71 | −0.24 |
| CMCase Activity | | | | |
| Incubated forage | −0.05 | 0.77 | −.10 | 0.20 |
| Liquid fraction | 0.88 | 0.08 | 0.02 | 0.16 |
| Ruminal ammonia | 0.15 | −0.46 | 0.59 | 0.34 |
| pH | −0.31 | −0.03 | 0.21 | 0.79 |
| NDF disappearance | 0.90 | −0.10 | −0.19 | −0.07 |
| Liquid dilution | 0.77 | 0.20 | 0.20 | 0.01 |
| Particulate dilution | 0.91 | 0.18 | 0.09 | 0.02 |
| % total variance | 46.4 | 23.5 | 16.8 | 13.3 |

What is claimed is:

1. A method for stimulating microbial growth in the stomach of ruminal animals and increase the rate of digestion of food by said animals, which comprises:
   preparing DL-methionine in a slow release form suitable for incorporation in a ruminal animals food;
   feeding said slow release form of said DL-methionine to said ruminal animal at a rate of less than 10 grams per day;
   whereby said DL-methionine is slowly released over a period of time into the first stomach of said ruminal animal to target microflora residing in the liquid fraction of the contents of the ruminal, and thereby cause a stimulation of ruminal microbial growth and protein synthesis and thus increase the rate of digestion.

2. A method according to claim 1, wherein the animal is a cow, sheep, or goat.

3. A method according to claim 1, wherein the DL-methionine is incorporated into a capsule, lozenger, pill, bolus, or a salt lick.

4. A method according to claim 1 whereby said feed rate is such that said DL-methionine is released in the stomach substantially continuously so as to provide substantially continuous stimulation of protein in the stomach.

5. A method for stimulating microbial growth in the stomach of ruminal animals to increase the rate of digestion of food by said animals and control the animal's growth which comprises:
   preparing DL-methionine in a slow release form suitable for incorporation in a ruminal animal's food; by incorporating the DL-methionine into a capsule, lozenger, pill, bolus, or salt lick;
   feeding said slow release form of said DL-methionine to said ruminal animal at a rate of less than 10 grams per day;
   whereby said DL-methionine is slowly released over a period of time into the first stomach of said ruminal animal to target microflora residing in the liquid fraction of the contents of the ruminal, and thereby cause a stimulation of ruminal microbial growth and protein synthesis, and thus increase the rate of digestion.

6. A method according to claim 5 wherein said feed rate is such that said DL-methionine is released in the stomach of the animal substantially continuously so as to provide substantially continuous stimulation of protein in the stomach.

* * * * *